United States Patent [19]
Blow

[11] Patent Number: 5,583,957
[45] Date of Patent: Dec. 10, 1996

[54] OPTICAL SWITCH

[75] Inventor: Keith J. Blow, Suffolk, Great Britain

[73] Assignee: British Telecommunications public limited company, London, England

[21] Appl. No.: 588,298

[22] Filed: Jan. 18, 1996

Related U.S. Application Data

[63] Continuation of Ser. No. 178,258, filed as PCT/GB92/01246, Jul. 9, 1992, abandoned.

[30] Foreign Application Priority Data

Jul. 9, 1991 [GB] United Kingdom .................. 9114731

[51] Int. Cl.$^6$ ........................................... G02B 6/26
[52] U.S. Cl. ................................. 385/21; 372/6; 372/42; 385/141
[58] Field of Search ................... 372/6, 20; 385/21, 385/39, 42, 46, 48, 50, 141, 142, 144, 126

[56] References Cited

U.S. PATENT DOCUMENTS

| | | | |
|---|---|---|---|
| 4,546,476 | 10/1985 | Shaw et al. | 372/6 |
| 4,553,238 | 11/1985 | Shaw et al. | 372/6 |
| 4,938,561 | 7/1990 | Grasso et al. | 372/6 |
| 5,136,670 | 8/1992 | Shigematsu et al. | 372/6 |
| 5,268,910 | 12/1993 | Huber | 372/20 |

FOREIGN PATENT DOCUMENTS

| | | | |
|---|---|---|---|
| 0442518A2 | 8/1991 | European Pat. Off. | |
| WO8603306 | 6/1986 | WIPO | 385/41 |

OTHER PUBLICATIONS

Thompson, "Analysis of Optical Directional Couplers That Include Gain or Loss and Their Application to Semiconductor Slab Dielectric Guides", Journal of Lightwave Technology, vol. LT–4, No. 11, Nov. 1986, pp. 1678–1693.

Setterlind et al, "Directional Coupler Switches with Optical Gain", IEEE Journal of Quantum Electronics, vol. QE–22, No. 5, May, 1986, pp. 595–602.

Gershoig et al, "Optical Characteristics of Devices with Coupled Waveguides Utilizing Semiconductor Heterostructures", Sov. J. Quantum Electron, 16(12), Dec. 1986, pp. 1621–1624.

Friberg et al, "Femotosecond Switching in a Dual–Core–Fiber Nonlinear Coupler", Optics Letters, 13 (1988) Oct., No. 10, New York, USA, pp. 904–906.

*Primary Examiner*—John Ngo
*Attorney, Agent, or Firm*—Nixon & Vanderhye P.C.

[57] ABSTRACT

An optical switch includes a dual-core optical fibre coupler having waveguides which are erbium doped, silica-based fibre amplifiers. The waveguides are pumped by pump lasers which are used to control the mean differential gain of the waveguides to be zero or a first value at which two values the linear coupler is a cross-coupler or a through-coupler at an operating wavelength.

14 Claims, 2 Drawing Sheets

OPTICAL SWITCH

This is a continuation of application Ser. No. 08/178,258, filed as PCT/GB92/01246, Jul. 9, 1992, now abandoned.

BACKGROUND OF THE INVENTION

1. Field of the Invention

This invention relates to an optical switch and a method of operating such a switch and in particular to a linear coupler optical switch.

2. Related Art

When the waveguiding regions of optical waveguides are brought into close proximity, evanescent coupling of the fibre fields of an optical signal can occur leading to optical power transfer between the two waveguides. This is the basis of fused fibre couplers and polished couplers as described in *Elect. Lett.* 17, 243 (1981) "Fused Single Mode Access Couplers", CA Villarruel and RP Moeller and in *Elect. Lett.* 18, 929 (1982) "Single-mode Fibre Optic Directional Coupler" R Bergh, G Kotler and HJ Shaw, respectively. These are four-port linear couplers with one input port and one output port being provided by the ends of each waveguide. An optical signal coupled into one port of one waveguide will, if at an appropriate wavelength, initially propagate along that waveguide but will couple across to the other waveguide in a characteristic distance known as the coupling length which is a function of the wavelength of the optical signal.

The coupling length is also referred to as the half-beat length as it is half the length necessary for the optical signal to couple to the other waveguide and then couple back again, ie a single beat. A three half-beat coupler will couple an optical signal coupled to the input sort of one optical waveguide to the output port of the other waveguide; a two half-beat coupler will couple an optical signal coupled to the input port of one optical waveguide to the output port of the same waveguide.

BRIEF SUMMARY OF THE INVENTION

According to a first aspect of the present invention there is provided an optical switch for switching optical signals at an operating wavelength comprising a pair of optical waveguides configured as a four-port linear coupler and characterised in that the waveguides are controllable to provide a mean differential gain coefficient which is equal either to zero or to a first non-zero value, at which two values the linear coupler is a cross-coupler or a through-coupler at the operating wavelength.

An optical signal at the operating wavelength coupled to an optical waveguide of such a switch will exit via the same or other waveguide according to whether the mean differential gain coefficient is a zero or the first value. As will be explained later, the mean differential gain coefficient can be positive or negative as can the actual gain provided to the optical signal by a given waveguide of the switch.

According to a second aspect of the present invention there is provided a method of operating an optical switch between a first state and second state, said switch comprising a pair of optical waveguides (4, 6) configured as a four-port linear coupler and having a mean differential gain coefficient, the method comprising adjusting the mean differential gain coefficient of the waveguides between a value of zero and a non-zero value, such that in the first state the linear coupler is a cross-coupler, and in the second state the linear coupler is a through-coupler.

The operation of linear couplers can be described in terms of interferometric beating between the global modes of the two constituent waveguides. In general the choice between, the global mode picture and the evanescent coupling picture is a matter of taste but in this application on the local mode description is more convenient since the absorption is diagonal in this representation. The generalisation of the standard coupled mode equations set out by AW Synder and JD Love in the book "Optical Waveguide Theory" Published by Chapman and Hall, London 1083 can be written $$i\frac{da}{dz} = \lambda b - i\Gamma_a a \quad (1)$$

$$i\frac{db}{dz} = \lambda a - i\Gamma_b b$$

where a and b are the optical signal strengths in the respective waveguides, $\lambda$ is the coupling coefficient between the waveguides and $\Gamma_a$ and $\Gamma_b$ are the absorption coefficients. Since this is a simple linear equation we insert the trial solution exp(iwz) to obtain the following eigenvalue equation $$\begin{bmatrix} -i\Gamma_a & \lambda \\ \lambda & -i\Gamma_b \end{bmatrix} = -\omega I \quad (2)$$

which yields the eigenvalues $$\omega_\pm = i\overline{\Gamma} \pm \sqrt{\lambda^2 - (\overline{\Delta\Gamma})^2} \quad (3)$$

where $\overline{\Gamma}=(\Gamma_a+\Gamma_b)/2$ and $\overline{\Delta\Gamma}=(\Gamma_a-\Gamma_b)/2$ are the mean gain and the mean differential gain coefficients respectively. The solution for the two field components is then given by $$a = Ae^{i\omega_+ z} + Be^{i\omega_- z} \quad (4)$$

$$b = \frac{-\omega_+ + i\Gamma_a}{\lambda} Ae^{i\omega_+ z} + \frac{-\omega_- + i\Gamma_a}{\lambda} Be^{i\omega_- z}$$

with A and B determined by the initial conditions in the normal way. Equation (4) is strictly only valid when $\omega_+ \neq \omega_-$. When the eigenvalues are degenerate an extra solution $ze^{\omega z}$ must be introduced. In the absence of any gain or loss the eigenvalues reduce to $\pm\lambda$ which gives the familiar coupling behavior with a beat length of $\pi/\lambda$.

If the gain is symmetric, $\Delta\Gamma=0$, then the eigenvalues both acquire the same imaginary part as we would expect for a uniform gain. However, when the gain is asymmetric the real part of the eigenvalue is reduced corresponding to an increase in the coupling length so a linear coupler which is a three half-beat coupler at a given operating wavelength can become a two half-beat coupler at that wavelength for certain values of mean differential gain. The dependence of the coupling of a signal from one waveguide to the other as a function of the mean differential gain will be discussed in more detail later in this application.

The switch may be configured such that at the zero and the first value of the mean differential gain coefficient the linear coupler is, respectively, a substantially odd integer half-beat coupler and a substantially even integer half-beat coupler at the operating wavelength. Preferably the switch is such that at the zero and the first value of the mean differential gain coefficient the linear coupler is, respectively, a substantially three half-beat coupler and a substantially two half-beat coupler at the operating wavelength as this can provide full switching whilst being the easiest of the multi-half beat length linear couplers to manufacture.

The optical waveguides are conveniently provided by a dual-core optical fibre such as described, for example, in an article titled "Femtosecond Switching in a Dual-Core Fibre Nonlinear Coupler", *Optics Lett.* 13, 904–6 (1088) by SR Friberg, AM Weiner, Y Silberberg, BG Sfez and PW Smith as this provides a uniform interaction region which is readily manufactured to the required dimensions but other forms of linear coupler may be usefully employed such as doped planar waveguides, for example planar silica and lithium niobate waveguides.

The optical waveguides preferably comprise optical fibre amplifiers as the mean differential gain can be readily controlled by controlling the amount of optical pumping of the waveguides. It may be sufficient to provide only one of the waveguides as an amplifier if it can provide sufficient gain to obtain the first value of the mean differential gain coefficient.

A convenient optical fibre amplifier suitable for use in switching optical signals within the standard telecommunications windows is the Erbium doped, silica optical fibre amplifier. An advantage of this amplifier is that it is a three level system which means the loss introduced by an unpumped waveguide is approximately equal to the maximum available gain when the population is fully inverted so providing a greater available mean differential gain coefficient for a given gain availability. Such a switch may be operated by pumping one of the waveguides, only, so as to provide the first value of mean differential gain coefficient.

An optical switch according to the present invention and having optical amplifier waveguides may be operated by pumping both waveguides to so as provide zero net gain to a signal at the operating wavelength when providing a zero mean differential gain coefficient thereby providing a zero insertion loss switch.

BRIEF DESCRIPTION OF THE DRAWINGS

The present invention will now be described, by way of example only, with reference to the accompanying drawings of which.

DETAILED DESCRIPTION OF EXEMPLARY EMBODIMENTS

It was stated above with reference to equations 4 that when the gain is asymmetric the real part of the eigenvalue is reduced corresponding to an increase in the coupling length so a linear coupler which is a three half-beat coupler at a given operating wavelength can become a two half-beat coupler at that wavelength for certain values of mean differential gain.

As a specific example consider the case where b=0 at the input and we take A=1 (without loss of generality). The solution is easily shown to be $$a = e^{i\omega_+ z} - \frac{(-\omega_+ + i\Gamma_a)}{(-\omega_- + i\Gamma_a)} e^{i\omega_- z} \quad (5)$$

$$b = \frac{(-\omega_+ + i\Gamma_a)}{\lambda} (e^{i\omega_+ z} - e^{i\omega_- z})$$

Figure 2:
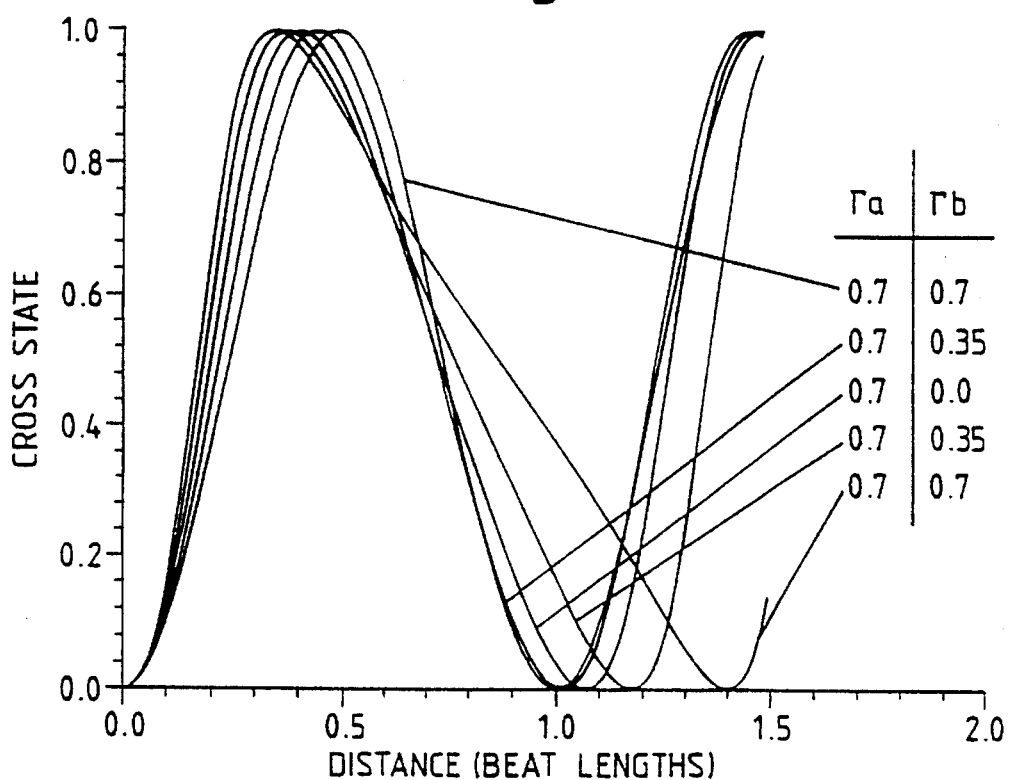
FIG. 2 is a graph of an optical signal coupled across the waveguides of an optical switch according to the present invention as a function of distance of propagation along the coupler for various values of mean differential gain coefficient.

The behaviour of such a coupler as a function of the gain asymmetry is shown in FIG. 2. The fraction of the total energy in the cross state, i.e. coupled from one waveguide into the other, is plotted as a function of distance along the coupler for various values of the gain asymmetry. At a single half-beat length, at the operating wavelength for zero mean differential gain coefficient, there is strong modulation of the cross state transmission fraction provided by a non-zero mean differential gain coefficient, but insufficient to be of use. However, a three half-beat length device (again at the operating wavelength for zero mean differential gain coefficient) shows total modulation. As the gain is increased in one arm, which changes the mean differential gain coefficient, the fraction of energy in the cross state reduces and indeed can go to zero.

Figure 3:
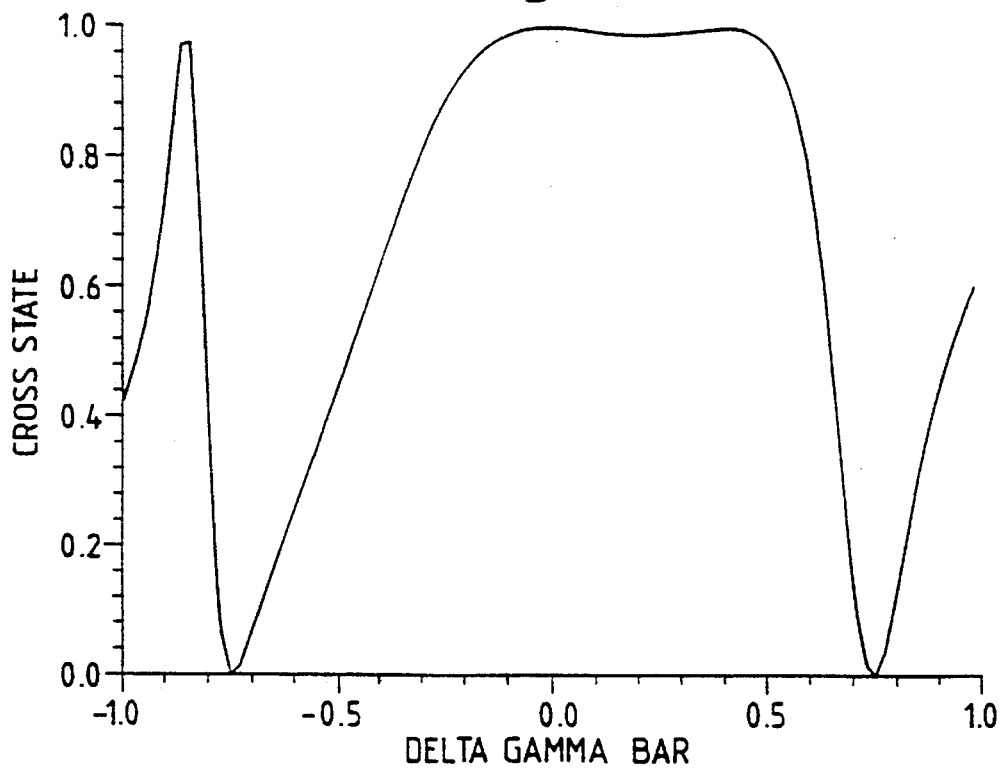
FIG. 3 is a graph of the optical signal coupled across an optical switch according to the present invention as a function of mean differential gain coefficient for a coupler according to the present invention.

In FIG. 3 there is shown the cross state switching fraction as a function of the differential mean gain coefficient $\overline{\Delta\Gamma}$ for a three half-beat length device.

The curve does not depend on the mean gain but does depend on the device length. The asymmetry in FIG. 3 is not particularly surprising given the asymmetric gain provided by the waveguides of the device. One can obtain a simple expression for the switching point by comparing the phase shift in the b field for the symmetric and asymmetric cases. Full switching occurs in a (2n+1) beat length coupler when $$\frac{\overline{\Delta\Gamma}}{\lambda} = \sqrt{4n+1} \; / (2n+1)$$

Figure 1:
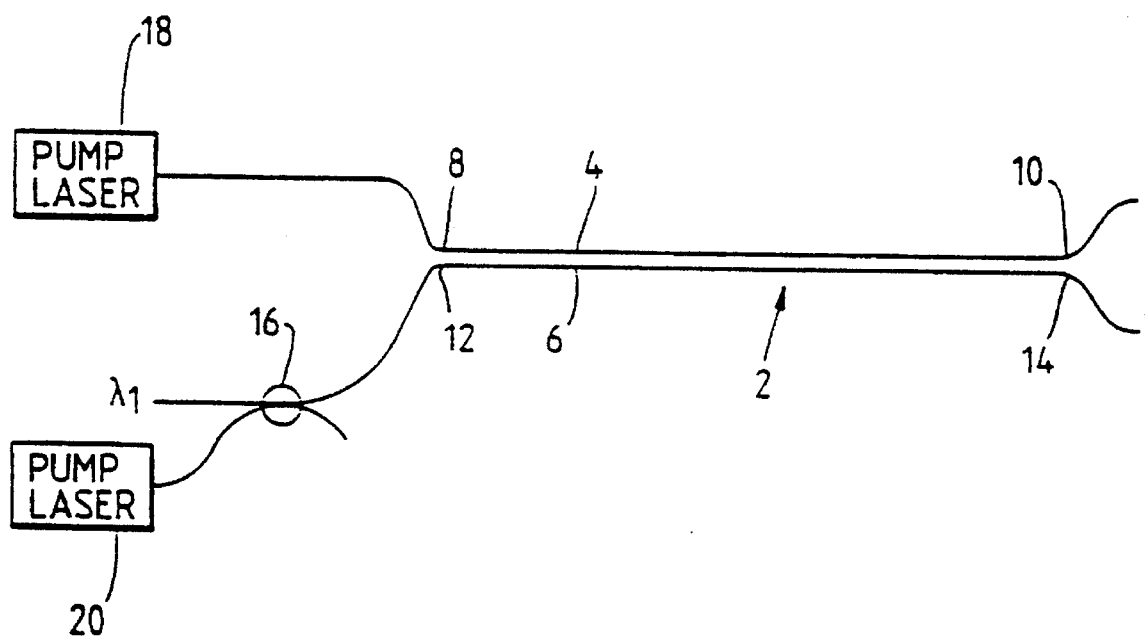
FIG. 1 is a schematic diagram of an optical switch according to the present invention.

Referring now to FIG. 1 an optical switch comprises a four-port linear coupler configured as dual-core silica optical fibre, with waveguiding cores 4 and 6, each core being doped with Erbium ions to form fibre amplifiers. The waveguide defined by core 4 has optical ports 8 and 10, one at each end. Similarly, the waveguide defined by core 6 has optical ports 12 and 14, one at each end. In this device, port 12 is used, arbitrarily, as an input port to the switch 2 and ports 10 and 14 are the output ports.

An input signal at an operating wavelength, $\lambda_1$ is coupled to port 12 via a dichroic coupler 16.

Pump lasers 18 and 20, both operating at approximately 980 nm, are coupled directly to the port 8 and indirectly via the coupler 16, respectively. The gain available to the optical signal from each Erbium doped waveguide is controlled by controlling the amount of optical pump power coupled to each core.

The length of the coupler is such that for zero mean differential gain coefficient the coupler is a substantially three half-beat coupler at the operating wavelength $\lambda_1$ and the fibre doped sufficiently to allow optical pumping of one waveguide to provide a sufficiently large mean differential gain coefficient to make the coupler a two half-beat coupler at the operating wavelength.

If we treat the Er amplifier waveguides 4 and 6 as perfect three level systems then the unpumped loss is equal in size to the maximum available gain when the population is fully inverted. For the parameters used in FIG. 2, a half-beat length of 1 m would correspond to an unpumped loss ($\Gamma$=0.7) of 6.1 dB/m. In a three half-beat length coupler we require the waveguides to have equal and opposite values of $\Gamma$. This has the advantage of ensuring the overall device gain to be unity and would only require a single arm gain of 19.4 dB.

I claim:

1. An optical switch for switching optical signals at an operating wavelength comprising:

a pair of optical waveguides configured as a four-port linear coupler, and means for controlling said waveguides to provide a mean differential gain coefficient which is equal either to a value of zero or to a first non-zero value, at which two values the linear coupler cross-couples optical signals input to one waveguide to be output from the other waveguide or through-couples optical signals input to one waveguide to be output from the same waveguide wherein, at the zero and the first non-zero value of the mean differential gain coefficient the linear coupler is a substantially three half-beat coupler or a substantially two half-beat coupler at the operating wavelength.

2. An optical switch for switching optical signals at an operating wavelength comprising:

a pair of optical waveguides configured as a four-port linear coupler, said waveguides being controllable to provide a mean differential gain coefficient which is equal either to a value of zero or to a first non-zero value, at which two values the linear coupler acts to couple optical signals input to one waveguide to be output from the other or the same waveguide at the operating wavelength, at the zero and the first non-zero value of the mean differential gain coefficient the linear coupler being, respectively, a substantially odd integer half-beat coupler and a substantially even integer half-beat coupler at the operating wavelength.

3. A switch as in claim 2 in which at the zero and the first non-zero value of the mean differential gain coefficient the linear coupler is, respectively, a substantially three half-beat coupler and a substantially two half-beat coupler at the operating wavelength.

4. An optical switch for switching optical signals at an operating wavelength comprising:

a pair of optical waveguides configured as a four-port linear coupler, and means for controlling said waveguides to provide a mean differential gain coefficient which is equal either to a value of zero or to a first non-zero value, at which two values the linear coupler cross-couples optical signals input to one waveguide to be output from the other waveguide or through-couples optical signals input to one waveguide to be output from the same waveguide;

wherein the optical waveguides are configured as a dual-core optical fibre.

5. An optical switch for switching optical signals at an operating wavelength comprising:

a pair of optical waveguides configured as a four-port linear coupler, and means for controlling said waveguides to provide a mean differential gain coefficient which is equal either to a value of zero or to a first non-zero value, at which two values the linear coupler cross-couples optical signals input to one waveguide to be output from the other waveguide or through-couples optical signals input to one waveguide to be output from the same waveguide;

wherein at least one of the optical waveguides comprises an optical fibre amplifier.

6. A switch as in claim 5 wherein the optical fibre amplifier operates as a three-level system.

7. A switch as in claim 5 in which both optical waveguides comprise optical fibre amplifiers.

8. A switch as in claim 5 in which the value of mean differential gain coefficient is controlled by controlling the optical pumping of the waveguides.

9. A switch as in claim 5 in which the optical fibre amplifiers are Erbium doped, silica optical fibres.

10. A method of operating an optical switch as in claim 5, said method comprising pumping both waveguides so as to provide zero net gain to a signal at the operating wavelength when providing a zero mean differential gain coefficient.

11. A method of operating an optical switch as in claim 5, said method comprising pumping one of the waveguides only, so as to provide the first non-zero value of mean differential gain coefficient.

12. A method of operating an optical switch between a first state and a second state, said switch comprising a pair of optical waveguides configured as a four-port linear coupler and having a mean differential gain coefficient, the method comprising adjusting the mean differential gain coefficient of the waveguides between a value of zero and a non-zero value, such that in the first state the linear coupler couples optical signals input to one waveguide to be output from the other waveguide, and in the second state the linear coupler couples optical signals input to one waveguide to be output from that same waveguide, wherein, at the zero and the first non-zero value of the mean differential gain coefficient the linear coupler is a substantially three half-beat coupler or a substantially two half-beat coupler at the operating wavelength.

13. A method as in claim 12 wherein the optical switch is moved from the first state to the second state by adjusting the mean differential gain coefficient from the value of zero to the non-zero value.

14. A method for operating an optical switch as in claim 5, said method comprising pumping one of the waveguides only, so as to provide the first non-zero value of mean differential gain coefficient.

* * * * *